June 13, 1950 W. F. KELLY 2,511,776
NONGLARE NIGHT DRIVING GLASSES
Filed Oct. 7, 1947
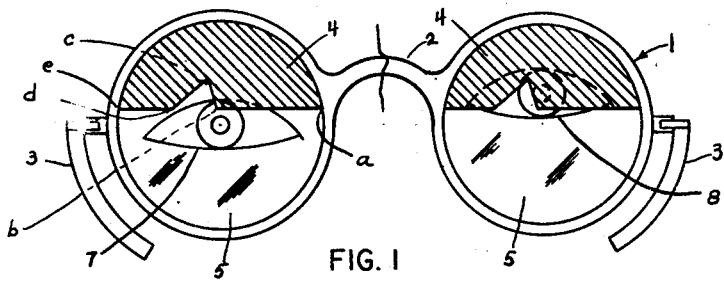
FIG. 1
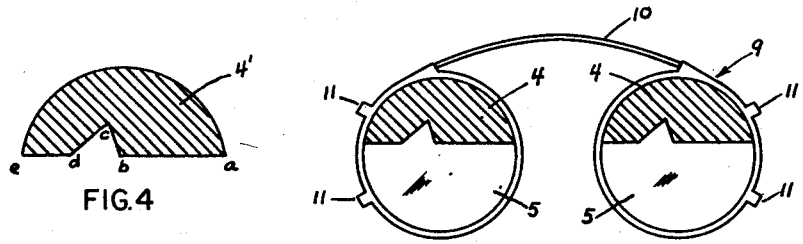
FIG. 4   FIG. 3
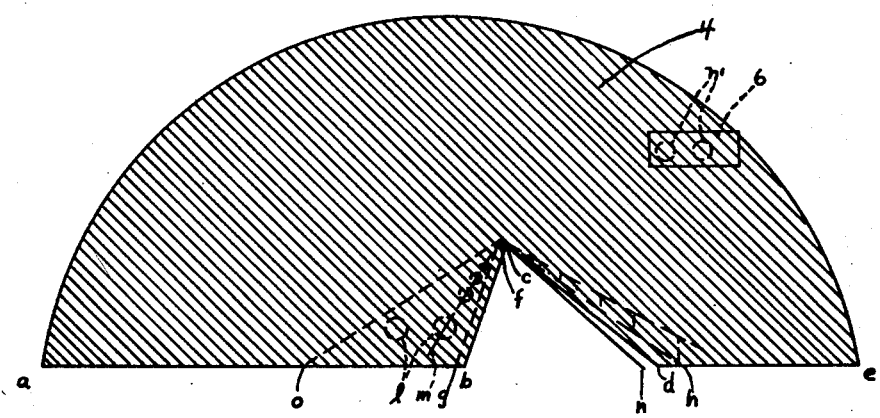
FIG. 2
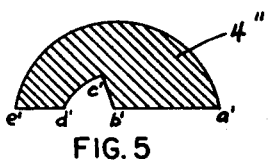   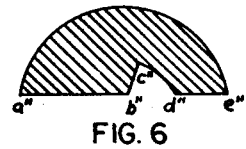
FIG. 5   FIG. 6
WILLIAM F. KELLY   Inventor
By Cushman, Darby & Cushman Patented June 13, 1950

2,511,776

UNITED STATES PATENT OFFICE 2,511,776

NONGLARE NIGHT DRIVING GLASSES

William F. Kelly, Darlington, S. C.

Application October 7, 1947, Serial No. 778,509

2 Claims. (Cl. 2—14)

My invention relates to improvements in devices for eliminating or preventing the glare from motor vehicle headlights approaching both from ahead and from the rear.

An object of the present invention is to provide means whereby vehicle drivers may have protection against glaring lights approaching from ahead and at the same time have a clear view of the path ahead and to the right of their vehicle.

Another object is to provide means for eliminating the glare reflected by the driver's rear vision mirror when glaring lights approach from the rear while at the same time the glare from headlights approaching from ahead is eliminated and clear view is provided in the path ahead and to the right of the driver's vehicle.

A further object is to provide means whereby the device for eliminating glare from headlights approaching from ahead may be placed in and out of use at an instant.

A still further object of the invention is to provide means for eliminating the glare reflected by the driver's rear vision mirror when the means for eliminating the glare from headlights approaching from ahead is not in use.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

In general, I carry out my invention by forming eye glasses with lenses comprising a translucent portion and a transparent portion. The translucent portion forms the upper and slightly less than half of the whole lens and is defined by a line of substantially the horizontal axis of the eye, which when viewed from the eye side of the wearer extends horizontally from the left side of the lens to a point slightly to the right of the vertical axis of the eye, thence the lower margin of the translucent portion extends upward and toward the right at an angle of about 70 degrees with the extension of the above horizontal defining line for a distance of about three-eighths of an inch, then downward and to the right at an angle of about 40 degrees with the extension of said horizontal line for a distance of about one quarter of an inch and then horizontally to the right margin of the lens. The remainder of the lens outline is transparent and this transparent portion may be of clear glass or other material or may be void.

The upper or translucent portion of the lens is thus formed with a lower horizontal margin having a cut-out portion in the form of a somewhat inverted V. The area of the translucent portion of the lens to the left of the leg of the inverted V when brought into use gives the wearer protection from an approaching car's headlights or a series of such headlights approaching to the wearer's left. The clear portion between the legs of the inverted V cut-out affords the wearer clear view of the road ahead of his vehicle as well as full view of the right hand side of the highway. The device gives sharp cutting lines of vision, the contours of which exactly fill the requirements of shading the wearer's or driver's eyes from glaring lights approaching to the left, gives a maximum of clear vision to the right in the path of vehicle and a wide area adjacent and to the right of the highway affording clear view of pedestrians, animals or other obstructions. The right hand portion of the translucent lens affords the wearer protection from reflected beams of light from the rear vision mirror that is customarilly mounted in a position above the upper center of the driver's windshield.

The word "lens" as used in the specification and claims means the complete lens surface or outline as usually considered in connection with eyeglasses which may be of various outside shapes and sizes. Where the word "frame" is used it signifies the usual shape of frames for eyeglasses, when frames are used for such glasses.

The word "transparent" where used is to indicate any glass or no material at all. "Translucent" where used signifies any glass, plastic or other material having light absorbing properties or light shading properties.

Referring to the drawing, which forms a part of the specification:

Figure 1 is a front, elevational view, looking toward the outside face of the lenses as mounted in a pair of spectacle frames; the left hand half of this figure shows the translucent or upper half of the lens above the right eye of the wearer and not in use; the right hand half of this figure illustrates the translucent portion of the lens in use and the portion of the left pupil of the wearer with respect to the inverted V cut-out portion in the translucent lens.

Figure 2 is an enlarged view from the wearer's side of the translucent lens portion in use when driving a vehicle, illustrating how a highway ahead of the vehicle and its vanishing point appears to the wearer, as well as series of approaching car headlights, a fence along the right hand side of the road and the appearance of the rear view mirror having reflected light images.

Figure 3 is a view similar to Figure 1 showing the lens mounted in frames which may be clipped onto a wearer's regular spectacles.

Figure 4 is a view of a separate and unmounted translucent lens portion as viewed from the opposite side of the wearer and made according to the invention.

Figure 5 is a view similar to Figure 4 of a modified form of translucent lens portion wherein the left leg, as here viewed, of the inverted V cut-out portion, is in the form of an arc instead of a straight line.

Figure 6 is a view of a modified form of translucent lens portion shown in Figure 5 arranged with the inverted V cut-out portion oppositely positioned to that shown in Figure 5 so that the lens can be used by a driver where traffic is customarily on the left-hand side instead of the right-hand side of the highway.

In the drawing like reference numerals and characters apply to the various figures represented.

In the drawing 1 indicates generally the frame of a pair of spectacles having a connecting bridge or nose piece 2 and temple members 3.

Each of the lenses consists of a translucent portion 4 and a transparent portion 5. The translucent portion 4 is intended to absorb enough of the light rays from other vehicles' headlights so as not to blind the wearer. This translucent portion may be made of glass, either optical or some other colored glass, or such other material as will provide suitable means for carrying out the purpose of the invention. Material such as transparent plastic light polarizing sheets, e. g., polaroid sheets, may be used for the translucent portion.

Referring to Figure 2 wherein is shown an enlarged view of the translucent portion of the lens 4 as viewed from the wearer's side, the lower edge of the translucent portion, which forms substantially the upper half of the lens, is defined by a substantially horizontal line extending from the left side as at $a$ to a point $b$ just to the right of the vertical axis, then upwardly and to the right to point $c$ at an angle of about 70 degrees with the horizontal line $ab$ extended as to $d$, then downwardly and to the right to $d$ at an angle of about forty degrees with the horizontal and then substantially horizontal to the right margin $e$ of the lens. To avoid confusing the remainder of the view a broken line has not been drawn between $b$ and $d$ to show the horizontal line $ab$ extended. If such a broken line were drawn from $b$ to $d$, the angle $dbc$ would be about 70 degrees and the angle $bdc$ would be about 40 degrees. In the lens shown in the frames in Figures 1 and 3, the point $b$ is about one-thirty second of an inch to the left of the vertical axis of the lens. The vertical axis of the lens and a line representing the vertical axis of the eye lie in a vertical plane. The line $bc$, Figures 1 and 2, extends about one-quarter of an inch and the line $cd$ is about three-eighths of an inch in length. The cut-out or void portion $bcd$ in the translucent portion of the lens is in the form of a somewhat inverted V.

Referring again to Figure 2, the view as depicted here is that which is seen by an eye of a driver of a motor vehicle having this translucent lens in front of one of his eyes. The point $f$ represents the vanishing point and in this particular case the point of convergency of the center line $gf$ of a highway and $hf$, a fence along the right hand side of the highway. The line $nf$ represents the right hand side of the highway while the line $of$ represents the left hand side of the highway. To the left of the center $gf$ of the highway, there is represented at $l$ a pair of headlights of an approaching vehicle. Just above and to the right of headlights $l$ is shown a series of single headlights of a series of approaching vehicles (not shown) that are following behind the leading car having the headlights $l$. The line $mf$ represents the common line that would pass through the corresponding headlights of the series of vehicles and this common line is seen to also converge at $f$. The rays of light from the approaching headlights as seen by the eye have their objectionable glare removed by the translucent lens portion 4 before they reach the eye.

At 6 in Figure 2 there is represented how the customary rear vision mirror mounted on the lens wearer's car would appear to the eye of the lens wearer. This rear vision mirror is positioned in the upper center portion of the windshield (not shown). The images of the headlights of a vehicle approaching the rear of the lens wearer's car are indicated at $n'$ in this rear vision mirror. Thus, the glare from the rays reflected from the rear vision mirror and as seen by the wearer's eye are interrupted by the upper right hand portion of the translucent lens 4.

In the left half of Figure 1, the translucent or upper half of the lens 4 is above the right eye 7 of the wearer and the translucent portion of the lens is not in use for vision ahead of the wearer. However, the translucent portion of the lens 4 is available for cutting down the glare of rays of light reflected by the rear vision mirror 6, see Figure 2.

The right half of Figure 1, shows the translucent or upper half of the lens 4 in use by the left eye 8 of the wearer. In order to instantly bring the translucent portion of the lens into use for vision ahead it is merely necessary to tilt the head downward a slight amount. The two positions of use and non-use for vision ahead through the translucent portion of the lens 4 are thus shown side by side in Figure 1. The glasses are shown as by the break line through the nose piece 2 to represent the use and non-use positions for ahead vision of the wearer of the translucent lens portion 4. When the glasses are worn by the driver the view of the lens and the eye shown in the left half of the Figure 1 would likewise appear in the right hand half of the figure when the glasses were in non-use for ahead vision. The converse of the above would apply to the right hand half of the Figure 1 when the lens portions 4 were in use for vision ahead.

Referring again to Figure 2, the cut-out portion $bcd$ of the lens portion 4 permits a clear view of the highway ahead and towards the right while at the same time the anti-glare portion of the lens cuts down the glare from approaching vehicles both from ahead and from the rear.

It will be seen in Figure 2 that the center line $gf$ of the highway is nearly parallel to the contour line $bc$ of the translucent lens portion 4. Likewise, the common line $mf$ through a series of approaching headlights is actually substantially parallel to the center line $gf$ of the highway although here shown in perspective as converging at *f*. The direction of the contour portion *bc* of the translucent lens portion 4 is an important feature of this invention. This line *bc* is substantially 70 degrees with the horizontal and it permits of a safe amount of the translucent lens portion to its left side to shield from the wearer's eye the glare from a series of approaching cars' headlights. At the same time the line *bc* defines with the leg *dc* of the inverted V cut-out portion, a clear area of vision for the wearer or driver both ahead of his vehicle and to the right hand side of the road where obstructions, such as pedestrians, might occur. By the driver having protection from the glare of approaching vehicles both from ahead and from behind and at the same time a clear view ahead of his car and to the right hand side of the road, the safety of the pedestrians as well as the driver is maintained.

In Figure 2 it will be seen that clear vision in the rear vision mirror may be obtained by tilting the head slightly backward, thereby moving the cut-out portion *bcd* into the line of vision from the wearer's eye to the rear vision mirror. In case the rear vision mirror is mounted lower, as it might be in some vehicles, a slight tilt of the head backward would permit the whole translucent portion 4 to be removed from the line of vision from wearer's eye to the mirror 6.

Referring now to Figure 3, there is shown a modified form of mounting the lenses wherein they are secured in a clip on type of frame generally indicated at 9. A flexible bridge piece 10 joins each of the frames carrying the lenses and suitable clip members 11 fast to the frame 9 hold the glasses in position over a wearer's regular glasses.

In Figure 4 there is shown a separate translucent lens portion 4' which can be used separately either in a pair of spectacle frames or by attachment to the clear lenses of a pair of glasses as by suitable cementing. In case this lens portion 4' is attached to a pair of glasses, it would lend to the fabrication, if the material of the translucent lens portion is flexible so as to conform to any curvature of the lens on which it is attached.

Referring to Figure 5, there is shown a modified form of translucent lens portion 4". The contour defining line *b'c'* is the same as previously described for the lens shown in the other figures. The modification lies in having the contour line *c'd'* in the form of an arc instead of a straight line as in the lenses previously described. By making the line *c'd'* arc shaped, as shown in Figure 5, additional vision to the right hand side of the highway may be secured, assuming that the lenses as shown in Figure 5 were to replace the previously described lenses.

In Figure 6 there is shown a lens similar to that in Figure 5 but with the inverted substantially V-shaped cut-out portion *b"c"d"* positioned in the lens oppositely to that of the cut-out portion *b'c'd'* in the lens of Figure 5. The foot of the leg *b"c"* of the inverted substantially V-shaped cut-out portion is positioned just to the left of the vertical axis of the lens, as seen from the wearer's side of the lens. This positioning of the inverted substantially V-shaped cut-out portion is necessary when these anti-glare glasses are used in countries where it is customary to have the traffic drive on the left hand side of the highway as contrasted with driving on the right hand side of the highway. This same opposite positioning of the inverted substantially V-shaped cut-out portion applies equally as well to the lenses shown in the other figures.

I claim:

1. A lens for eliminating glare comprising a translucent portion and a clear portion, said translucent portion having a lower edge being defined by four substantially straight lines, the first of said lines extending substantially horizontally and substantially midway of the height of the lens from the edge of the latter to a point beyond the vertical axis thereof, the second of said lines extending from said point upwardly and away from the vertical axis of the lens at an angle of approximately 70° with the horizontal whereby when the eye of a user driving along the right side of a two-way highway is positioned in alignment with the vertical axis of the lens and above said first line said second line will appear in the view of said user parallel to and slightly to the right of the center-line of said highway, said second line having an upper end at approximately the perspective vanishing point in the view of said user when the latter's eye is positioned as recited above, the third of said lines extending downwardly from said upper end and away from said vertical axis and at an angle of approximately 40° with the horizontal so as to appear in said view of said user to be approximately parallel with and to the right of the right-hand edge of said highway, the fourth of said lines extending in alignment with said first line from said third line to the edge of said lens at a point on said edge diametrically opposite the point where said first line meets said edge.

2. Eyeglasses for eliminating glare comprising a pair of lenses, each of said lenses comprising a translucent portion and a clear portion, said translucent portion having a lower edge being defined by four substantially straight lines, the first of said lines extending substantially horizontally and substantially midway of the height of the lens from the edge of the latter to a point beyond the vertical axis thereof, the second of said lines extending from said point upwardly and away from the vertical axis of the lens at an angle of approximately 70° with the horizontal whereby when the eye of a user driving along the right side of a two-way highway is positioned in alignment with the vertical axis of the lens and above said first line said second line will appear in the view of said user parallel to and slightly to the right of the center-line of said highway, said second line having an upper end at approximately the perspective vanishing point in the view of said user when the latter's eye is positioned as recited above, the third of said lines extending downwardly from said upper end and away from said vertical axis and at an angle of approximately 40° with the horizontal so as to appear in said view of said user to be approximately parallel with and to the right of the right-hand edge of said highway, the fourth of said lines extending in alignment with said first line from said third line to the edge of said lens at a point on said edge diametrically opposite the point where said first line meets said edge, said second of said lines of each of said lenses being parallel with each other and said third of said lines of both lenses being parallel with each other.

WILLIAM F. KELLY.

(References on following page)

REFERENCES CITED

The following references are of record in the file of this patent:

UNITED STATES PATENTS

| Number | Name | Date |
|---|---|---|
| 1,616,967 | Halikman | Feb. 8, 1927 |
| 1,706,429 | Willard | Mar. 26, 1929 |
| 2,012,620 | Bean et al. | Aug. 27, 1935 |
| 2,146,544 | Kleine | Feb. 7, 1939 |

FOREIGN PATENTS

| Number | Country | Date |
|---|---|---|
| 305,513 | Great Britain | Feb. 6, 1929 |
| 327,736 | Italy | July 18, 1935 |
| 665,880 | Germany | Oct. 5, 1938 |